United States Patent [19]

Lange et al.

[11] 4,112,186

[45] Sep. 5, 1978

[54] ULTRAVIOLET ABSORBING COATINGS

[75] Inventors: Roger W. Lange; Harold G. Sowman, both of Maplewood, Minn.

[73] Assignee: Minnesota Mining and Manufacturing Company, St. Paul, Minn.

[21] Appl. No.: 763,603

[22] Filed: Jan. 28, 1977

Related U.S. Application Data

[60] Division of Ser. No. 534,371, Dec. 19, 1974, abandoned, which is a continuation-in-part of Ser. No. 455,212, Mar. 27, 1974, abandoned.

[51] Int. Cl.$^2$ ................................................. B32B 9/04
[52] U.S. Cl. ..................................... 428/411; 427/108; 428/412; 428/446; 428/539

[58] Field of Search ............... 428/411, 412, 539, 446; 427/108

[56] References Cited

U.S. PATENT DOCUMENTS 3,005,731 10/1961 Payne ..................................... 427/108
3,647,531 3/1972 Matsushita ............................ 427/108

Primary Examiner—Marion E. McCamish
Attorney, Agent, or Firm—Cruzan Alexander; Donald M. Sell; Temple Clayton

[57] ABSTRACT

Thin nonorganic films of complexes of titanium and stannous tin are formed on organic polymeric substrates to provide ultraviolet absorbing coatings which retard degradation of the polymeric material of the substrate due to ultraviolet light.

2 Claims, 2 Drawing Figures

ULTRAVIOLET ABSORBING COATINGS

This application is a division of application Ser. No. 534,371, filed Dec. 19, 1974, now abandoned, which is a continuation-in-part of application Ser. No. 455,212, filed Mar. 27, 1974, now abandoned.

This invention relates to essentially nonorganic compositions absorbing in the ultraviolet region of the spectrum, to processes for making such compositions and to composites of substrates and such compositions in insolubilized form. This invention further relates to the combinations of ultraviolet sensitive or degradable polymers having coatings of the essentially nonorganic ultraviolet absorptive coatings of the invention and particularly to the combination of polyarylsulfone substrates and coatings of the invention.

It is well known that the energy of radiation is proportional to the frequency and inversely proportional to the wavelength. As a result ultraviolet light is more energetic in effecting reactions and degradations than visible light. From a practical standpoint, deterioration due to ultraviolet light, as in sunlight, is relatively common particularly with organic materials which absorb light in the ultraviolet region.

Although thin films have been coated on glass as in optics for anti-reflection purposes, to provide electrical conductivity or to enhance resistance to abrasion, the application to polymeric materials of thin films for cut-off of ultraviolet light does not appear to have been particularly successful. This is particularly because the temperatures often used in forming the thin films e.g. coating on a hot surface, about 500° C., or subsequent pyrolysis cannot be tolerated by polymeric materials. A review of thin films is provided in the volumes Physics of Thin Films, G. Hass and R. E. Thun, editors, Academic Press, New York and London and particularly Vol. 5 (1969) Page 87 et seq. where there is a discussion of deposition of oxide layers from organic solutions. Titania films on glass appear to be of particular value. It appears that temperatures of treatment are generally too high for use with organic substrates although mention is made of such applications in U.S. Pat. No. 2,768,909. Rather more typical of conditions of treatment are those employed for making electrically conductive coatings on glass or ceramics using titanium or antimony alkyloxides with stannous alkoxides or acylates as described in U.S. Pat. No. 3,647,531.

It is one object of this invention to provide nonorganic coatings having ultraviolet absorptive ability when applied to organic substrates. A further object of the invention is to provide compositions for application to organic substrates to provide nonorganic ultraviolet absorptive coatings. A yet further object of the invention is to provide a process for protecting organic substrates for ultraviolet light. Yet other objects will be apparent hereinelsewhere.

In accordance with these and other objects of the invention, it has been found that compositions having excellent ultraviolet absorbing properties for coating on UV-sensitive organic substrates such as polyarylsulfones, aryl polyesters such as polyethylene terephthalate and the like are obtained by combining organic titanates, i.e. titanium alkyloxides, with stannous chloride or other soluble nonorganic stannous salts in suitable solvents such as ethanol, acetone or the like. A yellow color develops in the clear solution almost immediately indicating a reaction. The color is caused by absorption in the near ultraviolet particularly about 330 nm. and into the visible range, i.e. to about 400–500 nm. Evaporation at temperatures below about 50° C. yields a brittle amorphous yellowish material which can be redissolved in the same solvent or in solvents such as water, alcohols, esters and ketones and to a considerable extent in aliphatic hydrocarbons such as heptane, aromatic hydrocarbons such as benzene, dimethylformamide and dimethyl sulfoxide. When heated to about 120° C., the material is insolubilized. The yellow solution of the compound as formed or redissolved, is applied as a thin layer on a suitable substrate, and dried. There is obtained an ultraviolet absorptive visually transparent coating of pale yellow color which is still somewhat soluble. The coating may suitably be of a thickness of only 200 nm., in other words, of the order of magnitude of the wavelength of the light being absorbed. In general the coating weight may be from about 0.1 to about 5 gm. per square meter and is preferably in the range of about 0.5 to 2.5 gm. per square meter. It may display interference colors but these may be obscured by the slight yellowish color. The film is either aged for several days (about 75 hours) or heated to about 120° C. for a minute or two to form a nonorganic polymeric insoluble complex which is effective in providing a UV protective layer. It is believed that many of the alkyl groups of the titanate are lost during this process. Such thin coatings are applied to various organic polymeric substrates including gelatine layers of photographic film, color transparencies, prints, etc. to which they adhere well. They may also be applied to glasses, and other web materials including woven and nonwoven fabrics, and the like where protection from ultraviolet light is desired.

The ultraviolet absorptive composition or complex can also be formed by coating a thin layer of the titania source on the substrate, followed by a thin layer of the stannous material and subsequently heating the coated substrate. The coating of the titania source compound on the substrate by itself after drying is colorless and transparent. Similarly, the coating of stannous compound on top of the dried titania source compound is colorless and transparent. The resulting two-layer film is essentially non-absorbing with respect to ultraviolet radiation although titania is moderately absorptive at wavelengths of 320 nm. and lower. As the coated substrate is heated to about 120° C. for a few minutes, the colorless, transparent film is transformed to a yellow colored, transparent ultraviolet absorbing nonorganic film and absorption above 320 nm. is increased.

The source of titania may be titanium esters, e.g. alkyl titanates such as tetraisopropyl titanate, tetrabutyl titanate, tetra-2-ethylhexyl titanate, or titania gel prepared by evaporation of an acid hydrolysate of $Ti(OR)_4$.

Stannous compounds are salts which are somewhat soluble in organic solvents, such as stannous chloride, stannous sulfate, stannous fluoride, etc. It should be noted that stannic salts are inoperative so far as can be determined in providing ultraviolet protective coatings.

The coating solution may be prepared by varying the Ti:Sn molar ratio through such wide limits as 1:10 to 10:1. Ordinarily, the stannous salt is mixed with an organic solvent and the titanium compound is added thereto. A small amount of acetic, nitric, or hydrochloric acid may be added prior to adding the titanium compound but it appears that at least in some instances hydrolysis of stannous salts provides sufficient acid. The resulting mixture forms a yellow solution which may be separated from any insoluble phase and used directly to coat a substrate. The organic solvents used for these coatings may be methanol, ethanol, acetone, methyl ethyl ketone, benzene, toluene, heptane, N,N-dimethylformamide, dimethylsulfoxide, etc. The yellow compound formed is soluble in these solvents and can be readily coated on substrates (sheets, fibers, etc.) in coatings which dry to a thickness of about 200 nm. It is, of course, possible to produce thicker or thinner coatings. At this stage, the coating is still relatively soluble in organic solvents and water. However, as the coating dries in ambient air, it becomes less soluble. After three days (about 75 hours at 20° C.), the coating adheres to the substrate and is substantially insoluble. Conversion to a substantially insoluble adherent coating may be accomplished in about one to two minutes by heating the coated substrate to about 120° C. After heating, the slightly yellow adherent coating is substantially insoluble and is useful as an ultraviolet cutoff filter. Fade-O-Meter tests on polyarylsulfone, which is susceptible to UV degradation, showed significant improvement in haze level of coated samples after prolonged exposure to intense UV radiation. The haze level (measured by ASTM D-1003-61) indicates the degradation of the polymer.

Although we do not wish to be bound by the theory, it appears that the titania and tin may be incorporated in a polymeric-type structure with oxygen linkages. A small amount of halogen or other anion may also be present in the complex and there may be some residual alkyl groups. It may be postulated that the initially obtained yellowish material is somewhat linear and that cross-linking is involved in insolubilization. As stated, we do not wish to be bound by these theories as to the structures of our novel compositions.

The following examples are illustrative of this invention.

EXAMPLE 1

A coating solution was prepared by mixing 10 gm. $SnCl_2.2H_2O$ in 20 gm. of absolute ethanol. Ten grams of glacial acetic acid was added to the mixture and the mixture agitated. Tetraisopropyl titanate (12.6 gm.) was added to the agitated mixture and a clear yellow solution formed immediately. A sheet of polyarylsulfone (Astrel ®-polymer 300 available from Minnesota Mining and Manufacturing Co., 0.32 cm. thick) was wipe-coated on one surface with clear yellow solution and dried at room temperature for about 10 minutes. The coated sheet was then placed in an oven at 120° C. for about 3 minutes. A second sheet was coated on each side in the same manner and dried and heated as described before. A third sheet was coated, dried, and heated as described above and subsequently given a second coat in the same manner. Measurement of the ultraviolet transmission of the resultant sheets showed appreciably less transmission than for a sheet having no coating. Tests on Fade-O-Meter Model FDA-RC using ultraviolet light at about sevenfold normal sunlight intensity and exposure for 240 hours on an uncoated polymer showed a haze level of 24.7%, while the singly coated sheet showed a haze level of 6.3% and the sequentially doubly coated sheet had a haze level of 3.8%.

The haze level is a measure of the degradation of the polyarylsulfone.

The above solution was also coated on polyester film (0.25 mm.) by wiping the solution on one surface. The coating was allowed to dry for a few minutes. The coated sheet was then placed in an oven at 120° C. for about 2 minutes. The resulting film was light yellow in color, adhered to the polyester substrate, and was unaffected by washing with water. Comparison of ultraviolet transmission on coated and uncoated polyester showed significant cutoff of the ultraviolet with the coated sheet.

Substantially the same results are obtained by permitting the drying to proceed at room temperature (about 20° C.) for about 75 hours without heating.

EXAMPLE 2

Figure 1:
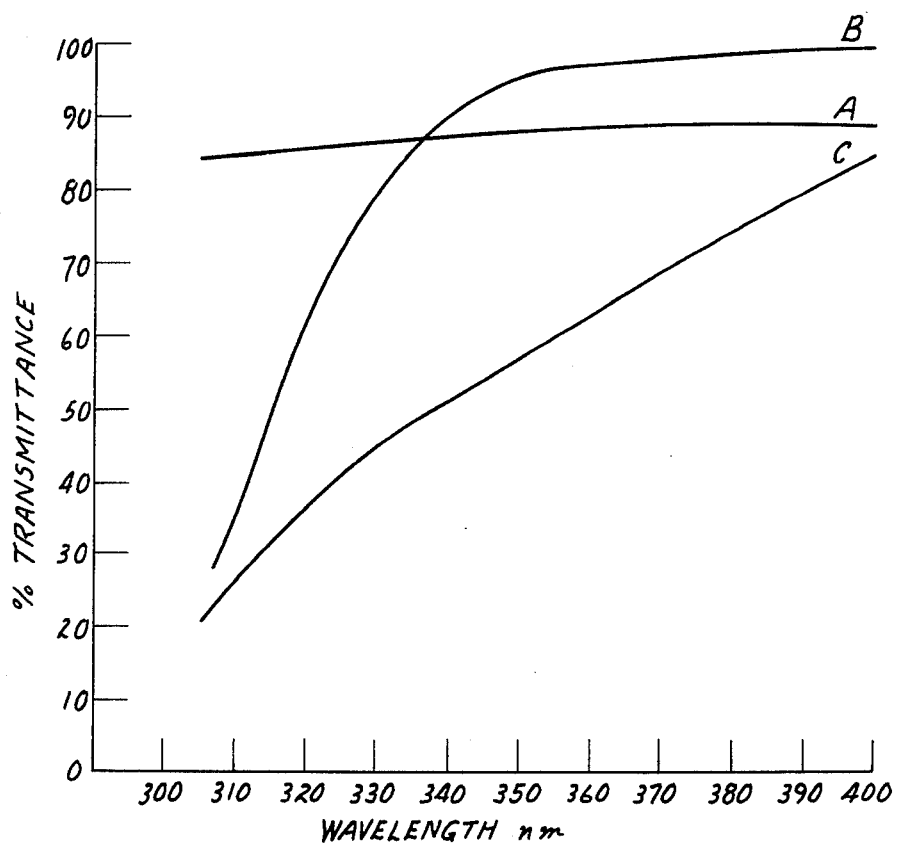
FIG. 1 is a graph comparing the transmittances of sheets prepared in Example 2.
Figure 2:
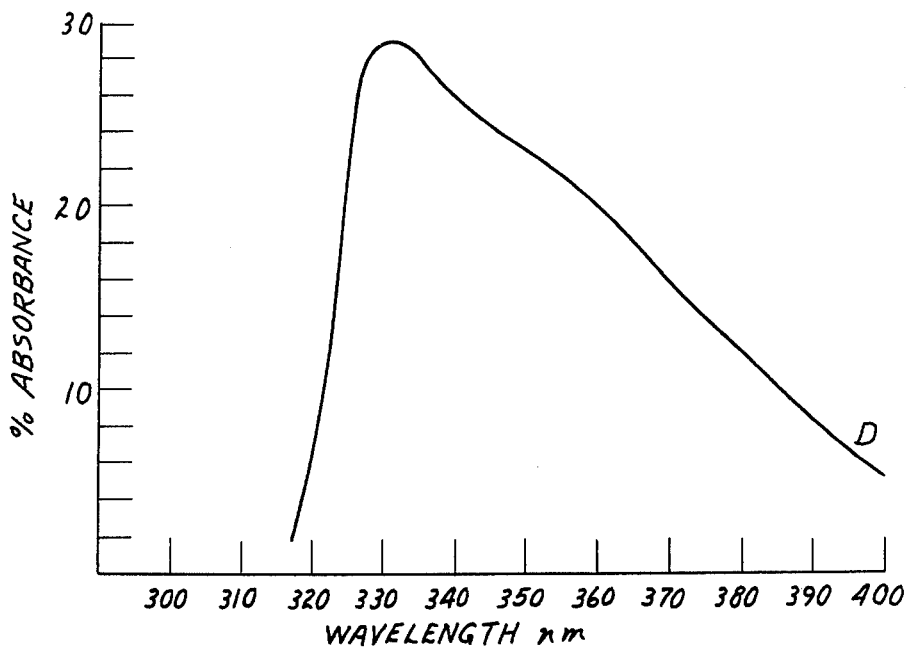
FIG. 2 is a graph showing the calculated absorbance curve.

Solutions, one containing 10 gm. $SnCl_2.2H_2O$ and the other 12.6 gm. $Ti(OC_3H_7)_4$ in approximately 20 gm. absolute ethanol and 10 gm. acetic acid were prepared and coated to a weight of about 1 gm. solute per square meter on 0.025 mm. thick polyester film, dried and heated for 2 minutes at 120° C. The sheets were designated A and B respectively, a third sheet (designated C) was prepared by combining equal parts of the two solutions and coating to give about 2 gm. solute per square meter. The three sheets were examined by ultraviolet absorption spectroscopy and the transmittance calculated for each. The results are shown as smoothed curves A, B and C (corresponding to Sn, Ti and Ti/Sn) in FIG. 1 herewith. In this form of curve, the absorption due to the base sheet (polyester) is cancelled out so that it would be represented by a horizontal line at 100% transmittance. Approximately and barring any reaction or synergistic effect, one might expect that curve C as an absorbance curve, i.e. 100% transmittance, would be the sum of the same absorbance curves for A and B. The difference between curve C and this calculated curve is shown in FIG. 2 as smoothed curve D in % absorbance. The absorbance peak at about 330 nm. appears to be associated with the color of the complexes formed in this invention.

In another test, a solution as made above was further diluted with 60 gm. absolute ethanol and coated on the emulsion surfaces of a color transparency and glossy color prints. Prolonged exposure to intense ultraviolet light (carbon arc) results in, more or less, the deterioration of the glossy surface of prints except where protected by the applied coating and somewhat greater fading of unprotected colors.

EXAMPLE 3

A coating solution was prepared by mixing 10 gm. $SnCl_2.2H_2O$ in 20 gm. absolute ethanol. Ten grams of glacial acetic acid was added to the agitated tin solution. The resulting solution was clear and colorless. Tetrabutyl titanate (15.1 gm.) was added to the stirred mixture and a clear yellow solution formed immediately. Polyester film (0.025 mm. thick) was coated with this solution by wiping the solution over the surface. The solution was allowed to dry for a few minutes, and then the coated sheet was placed in an oven at 120° C. for about 2 minutes. The coating on the sheet was insoluble in solvent transparent, light yellow in color, and adherent to the surface. Comparison of ultraviolet transmission on the coated and uncoated polyester films showed that the coated film absorbed ultraviolet light to a significantly greater extent.

EXAMPLE 4

A coating solution was prepared as described in Example 1 except that various acids were substituted for glacial acetic acid. The resulting clear, yellow solutions were wipe-coated on polyester as described previously, dried and heated. In each case, the resulting coating was insoluble, transparent, light yellow, and adhered to the substrate. The acids were:

A. 2.0 gm. 70% nitric acid
B. 2.0 gm. 37% hydrochloric acid
C. 10.0 gm. formic acid
D. 10.0 gm. propionic acid
E. 10.0 gm. lactic acid Comparison of ultraviolet transmission of the coated and uncoated polyester films showed significant cutoff of the ultraviolet with the coated films.

EXAMPLE 5

A coating solution was prepared by dissolving 20.0 gm. $SnCl_2.2H_2O$ in 60 gm. absolute ethanol. To this agitated solution was added 20 gm. glacial acetic acid. The resulting solution was clear and colorless.

A second coating solution was prepared by adding 20 gm. glacial acetic acid, and then 25.2 gm. of tetraisopropyl titanate to 55 gm. of absolute ethanol. The resulting solution was clear and colorless.

The titanate solution was wipe-coated on a sheet of polyester (0.025 mm. thick) dried at room temperature for a few minutes and the coated sheet was placed in an oven at 120° C. for about 2 minutes. The resulting sheet was clear and colorless. The tin solution was then wipe-coated over the titanate coating and this doubly coated sheet dried for a few minutes at room temperature. The resulting dried sheet bearing the two coatings was transparent and colorless. This double coated sheet was then placed in an oven at 120° C. for about 2 minutes. After heating, this sheet had an insoluble adherent, transparent, light yellow coating and exhibited significant cutoff of ultraviolet transmission.

Coatings applied in the reverse order gave substantially the same results.

EXAMPLE 6

A coating solution was prepared by dispersing 6.5 gm. of $TiO_2$ gel (61% equivalent $TiO_2$ — prepared by drying at room temperature an acid-hydrolyzed tetraisopropyl titanate) in 30 gm. absolute ethanol. To the clear, colorless, agitated dispersion 11.2 gm. of $SnCl_2.2H_2O$ was added. The resulting clear yellow mixture was wipe coated on polyester film (0.025 mm. thick) and the coated substrate dried at room temperature for several minutes. The dried transparent yellow coated substrate was then placed in an oven at 120° C. for about 2 minutes to form an insoluble adherent, transparent yellow coated film which had significantly reduced ultraviolet transmissivity.

Similar results were obtained when water was substituted for ethanol as the main solvent.

EXAMPLE 7

A coating solution was prepared by adding 12.6 gm. of tetraisopropyl titanate to 30 gm. methylethyl ketone. To the agitated clear solution, 10 gm. $SnCl_2.2H_2O$ was added to yield a clear, yellow solution. This solution was wipe-coated on polyester film (0.025 mm. thick) and dried at room temperature for several minutes. The resulting light yellow, transparent coated sheet was placed in an oven at 120° C. for 2 minutes to produce a yellow transparent sheet having significantly reduced ultraviolet transmissivity.

EXAMPLE 8

Coating mixtures were prepared by mixing 5.0 gm. $SnCl_2.2H_2O$ in 30 gm. of each of a number of solvents, namely, acetone, benzene, toluene, dimethylformamide, dimethylsulfoxide and heptane. The solvent was thoroughly agitated with the stannous salt and 5.0 gm. of glacial acetic acid was added to the agitated mixutre, followed by 5.0 gm. tetraisopropyl titanate. In each case a clear, transparent yellow supernatant solution was obtained. The solutions were decanted from any residual insoluble stannous salt and applied to sheet materials as above followed by drying and heating. Significant ultraviolet absorption was found in each case.

EXAMPLE 9

A coating solution was prepared as described in Example 1 except that 1.26 gm. tetraisopropyl titanate was used so that the ratio of Ti to Sn was 1 to 10. A clear light yellow solution was formed which was coated on polyester film as described previously. The dried and heat cured composite was transparent, light yellow and the insoluble coating adhered very well to the substrate.

The coated substrate showed a significantly reduced ultraviolet radiation transmission as compared to an uncoated polyester film.

EXAMPLE 10

A coating solution was prepared as described in Example 1 except that 1.0 gm. of $SnCl_2.2H_2O$ was used so that the ratio of Ti to Sn was 10 to 1. A clear light yellow solution was formed which was coated on polyester film as described previously. The dried and heat cured coated film was transparent, light yellow and the insoluble coating adhered very well to the substrate. The coated substrate showed significantly reduced ultraviolet radiation transmission as compared to an uncoated polyester film.

EXAMPLE 11

A coating solution was prepared as described in Example 1 except that 30 gm. of each of several alcohols was used. The resulting solutions were coated as described previously on substrates as shown in the following tabulation:

| Test | Alcohol | Substrate |
| --- | --- | --- |
| A | methyl | polyester |
| B | methyl | polyarylsulfone |
| C | methyl | polycarbonate |
| D | methyl | acrylate |
| E | n-butyl | polyester |
| F | i-propyl | polyester |

Comparison of ultraviolet transmission of coated and uncoated subtrates showed significant cutoff of the ultraviolet with the coated sheets.

What is claimed is:

1. A visually transparent composite of ultraviolet degradable polymeric sheet material and on at least one surface ultraviolet light absorptive insoluble complex of titanate ester and soluble stannous non-organic salt.

2. The visually transparent composite according to claim 1 of polyarylsulfone sheet and on at least one surface ultraviolet light absorptive insoluble complex of titanate ester and soluble stannous non-organic salt.

* * * * *